United States Patent [19]

Li

[11] Patent Number: 5,682,137
[45] Date of Patent: Oct. 28, 1997

[54] VEHICULAR ACCELERATION AND DECELERATION INDICATOR

[76] Inventor: Jia Li, 4423 Alan Dr., Apt. C, Baltimore, Md. 21229

[21] Appl. No.: 603,811

[22] Filed: Feb. 17, 1996

[51] Int. Cl.⁶ ..................................................... B60Q 1/50
[52] U.S. Cl. .................... 340/467; 340/429; 340/472; 340/479; 340/468; 200/61.45 R; 200/61.52
[58] Field of Search .................... 340/464, 467, 340/468, 472, 429; 200/61.45 R, 61.52, 61.48, 61.5

[56] References Cited

U.S. PATENT DOCUMENTS

| | | | |
|---|---|---|---|
| 3,019,415 | 1/1962 | Marior | 340/464 |
| 3,157,854 | 11/1964 | Riley | 340/467 |
| 3,332,060 | 7/1967 | Liljequist | 340/467 |
| 3,639,898 | 2/1972 | Booth | 340/467 |
| 3,651,293 | 3/1972 | Hoffman | 340/467 |
| 4,920,330 | 4/1990 | Plozner | 340/467 |
| 4,983,953 | 1/1991 | Page | 340/467 |
| 5,258,740 | 11/1993 | Viano et al. | 340/467 |

*Primary Examiner*—Jeffery Hofsass
*Assistant Examiner*—Daryl C. Pope
*Attorney, Agent, or Firm*—William S. Ramsey

[57] ABSTRACT

This invention is an enhancement to current automobile safety by providing addition information to a trailing vehicle concerning the rate of acceleration and deceleration of a vehicle equipped with the invention. The invention involves a weight which responses to inertial forces involved in acceleration and deceleration by the sequential activation of red lights in response to deceleration and green lights in response to acceleration.

18 Claims, 5 Drawing Sheets

VEHICULAR ACCELERATION AND DECELERATION INDICATOR

BACKGROUND OF THE INVENTION

1. Field of the Invention

This electrical-mechanical invention relates to external signals which indicate the acceleration or deceleration of a vehicle.

2. Description of Related Art

Drivers now rely on traditional brake light systems of the automobiles around them to determine whether their respective drivers are braking. These traditional brake light systems operate on an all or nothing principle.

Unfortunately trailing drivers may suffer an attention deficit due to the lack of data visually displayed by the leading car's brake lights. That is, the sameness of the intensity of the leading automobile's brake lights provides little information concerning the movement of the leading automobile.

U.S. Pat. No. 3,019,415 discloses stop signal lights activated by the application of the brake, through the hydraulic fluid or directly from the brake pedal itself.

U.S. Pat. No. 3,157,854 discloses an inertial system for activating stop lights. In one embodiment, a piston with associated rod moves forward as the vehicle decelerates, exposing the uninsulated portion of the rod to electrical contacts which activate lights in a sequential manner.

U.S. Pat. No. 3,332,060 discloses various arrangements in which inertial movement of a weight acts as a rheostat and varies the intensity of illumination of a vehicle's stop lights.

U.S. Pat. No. 3,639,898 discloses a vacuum operable switch assembly in which a leaf-type switch is used.

U.S. Pat. No. 4,920,330 discloses a mercury inertial transducer which activates LEDs in sequence from the outside of the signal light indicator to the center of the indicator.

Drivers now rely on brake light system of the vehicles around them to determine whether the vehicles are braking. These brake light systems operate on an all or nothing principle and do not provide information on the rate at which a vehicle is decelerating. In addition, current brake light systems provide no information on the rate of acceleration of the vehicle equipped with the system.

Unfortunately, trailing drivers may suffer an attention deficit due to the lack of data displayed by a leading vehicle's brake lights. That is, the information provided by the brake lights does not allow one to differentiate between a sudden, intense and a gradual, gentle application of the brakes, and between the corresponding rates of vehicle deceleration. Furthermore, current brake systems provide no information on the rate of acceleration of a vehicle.

SUMMARY OF THE INVENTION

Use of this invention will display to trailing drivers incremental changes in the vehicle's acceleration and deceleration. The device is mounted in the vehicle with an orientation so that the long axis of the inertial weight is parallel to the axis of the vehicle which extends from the front to the rear of the vehicle. This device responds to changes in inertia that occur on acceleration or deceleration due to application of the brake or accelerator, or any other cause of acceleration or decleration such as a sudden slowing on contacting a unexpected obstacle, or a sudden acceleration on encountering an steep downward slope.

This electrical-mechanical device is not connected to existing braking or accelerating systems. It may be installed as an aftermarket accessory or be incorporated at the factory. Its installation does not involve alteration of either the braking or acceleration systems of the vehicle. In particular, this device is installed without alteration of the hydraulic braking system. It's installation or use cannot contribute to failure of the braking system.

This device comprises the acceleration indicator, a light bar having an array of lights which indicate acceleration and deceleration and is mounted in the rear of the vehicle, and wiring connecting the indicator, light bar, and vehicle electrical system including the battery. The lights in the light bar preferably are arranged in rows, with one row of lights indicating decelleration and a second row of lights of a different color indicating acceleration.

The object of this invention in vehicle brake systems is to signal acceleration or deceleration of the vehicle to trailing vehicles.

Another object of this invention in vehicle brake systems ms to increase highway safety by offering greater information on vehicle movement to surrounding and trailing drivers.

Another object of this invention in vehicle brake systems is to alert following drivers to the intentions of the driver of a leading vehicle.

Another object of this invention in vehicle brake systems ms to provide a signaling system which may be installed easily in existing vehicles.

Another object of this invention in vehicle brake systems ms to provide a signaling system which operates without involvement of the hydraulic brake system.

Another object of this invention in vehicle brake systems is to provide an electro-mechanical signaling system which does not involve electronic components.

A final object of this invention in vehicle brake systems ms to provide an inexpensive, reliable, easily-manufactured acceleration and deceleration indicator system.

DESCRIPTION OF THE PREFERRED EMBODIMENTS

The acceleration and deceleration indicator system is comprised of the acceleration indicator, a light bar having a number of lights which indicate acceleration and deceleration, and wiring connecting the indicator, light bar, and vehicle battery.

A inertial weight in the acceleration indicator moves toward the front of the vehicle on deceleration and toward the rear of the vehicle on acceleration. As this weight moves, it activates a series of switch contacts which activate the illumination of a series of indicator lights, with red lights indicating vehicle deceleration and green lights indicating vehicle acceleration.

Figure 1:
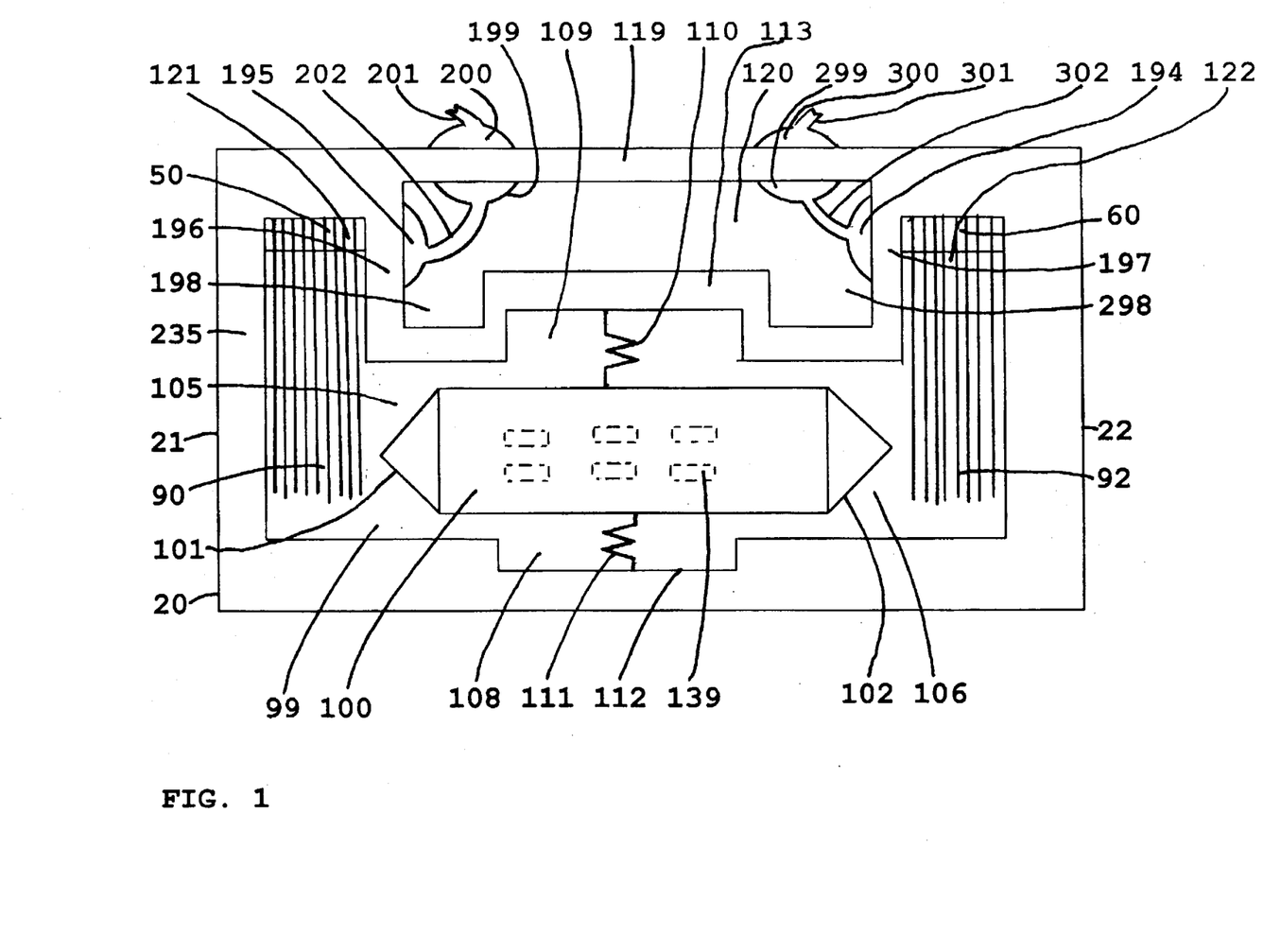
FIG. 1 is a top view of the main casing of the acceleration indicator with the top removed.

FIG. 1 is a top view of the lower main casing 235 of the acceleration indicator 20. The acceleration indicator 20 is installed in a vehicle with the front end 21 oriented toward the front end of the vehicle and with the rear end 22 oriented toward the rear end of the vehicle. A inertial weight 100 which is hexagonal in cross section is shown in the lower main casing 235. The inertial weight 100 rests on six wheels 139 which are attached to the lower main casing 235 by axles and which are shown in dashed outline in FIG. 1. The relationship between the inertial weight 100, lower main casing 235, and wheels 139 is shown in greater detail in FIG. 2.

The lower main casing 235 has a weight channel 99 which accommodates the inertial weight 100, the front leaf contacts assembly 50 located at the weight housing channel front 105, and the rear leaf contacts assembly 60 located at the weight housing channel rear 106. A left spring cavity 108 and a right spring cavity 109 are arrayed alongside the weight channel 99. The lower main casing 235 has a connector compartment 120 with a front connector recess 198 and a rear connector recess 298.

The inertial weight 100 is attached at the midpoint of the length of the inertial weight to one end of the left stasis spring 111 which is located in the left spring cavity 108. The other end of the left stasis spring is attached to the left spring cavity wall 112. Similarly, the inertial weight 100 also is attached to the right stasis spring 110 which is attached at the other end to the right spring cavity wall 113. The front end 101 and rear end 102 of inertial weight 100 are oriented toward the front end 21 and the rear end 22 of the acceleration indicator 20. With this arrangement the inertial weight 100 is free to move toward the front 105 or rear 106 of the weight channel 99. The movements of the inertial weight 100, however, are restrained by the stasis springs 110 and 111. The stasis springs 110 and 111 hold the inertial weight 100 in a neutral position as shown in FIG. 1 in the absence of inertial forces.

The front leaf contacts assembly 50 is located at the front end 21 of the acceleration indicator 20 in the front leaf contacts assembly recess 121. The front leaf contacts assembly 50 is mounted so the leaf contacts 90 extend into the front 105 of the weight channel 99. The rear leaf contacts assembly 60 is located at the rear end 22 of the acceleration indicator 20 in the rear leaf contacts assembly recess 122. The rear leaf contacts assembly 60 is mounted so the leaf contacts 92 extend into the rear 106 of the weight channel 99. Details of the leaf contacts assemblies are found in FIG. 3.

Conductors 195 from the front leaf contacts assembly 50 pass through the front connector recess wall 196 into the front connector recess 198 where they are bundled into a front conductor cable 202. The front conductor cable 202 is attached to a front female connector 199 located in the connector compartment wall 119. Conductors 194 from the rear leaf contacts assembly 60 pass through the rear connector recess wall 197 into the rear connector recess 298 where they are bundled into a rear conductor cable 302. The rear conductor cable 302 is attached to a rear female connector 299 located in the connector compartment wall 119.

Figure 2:
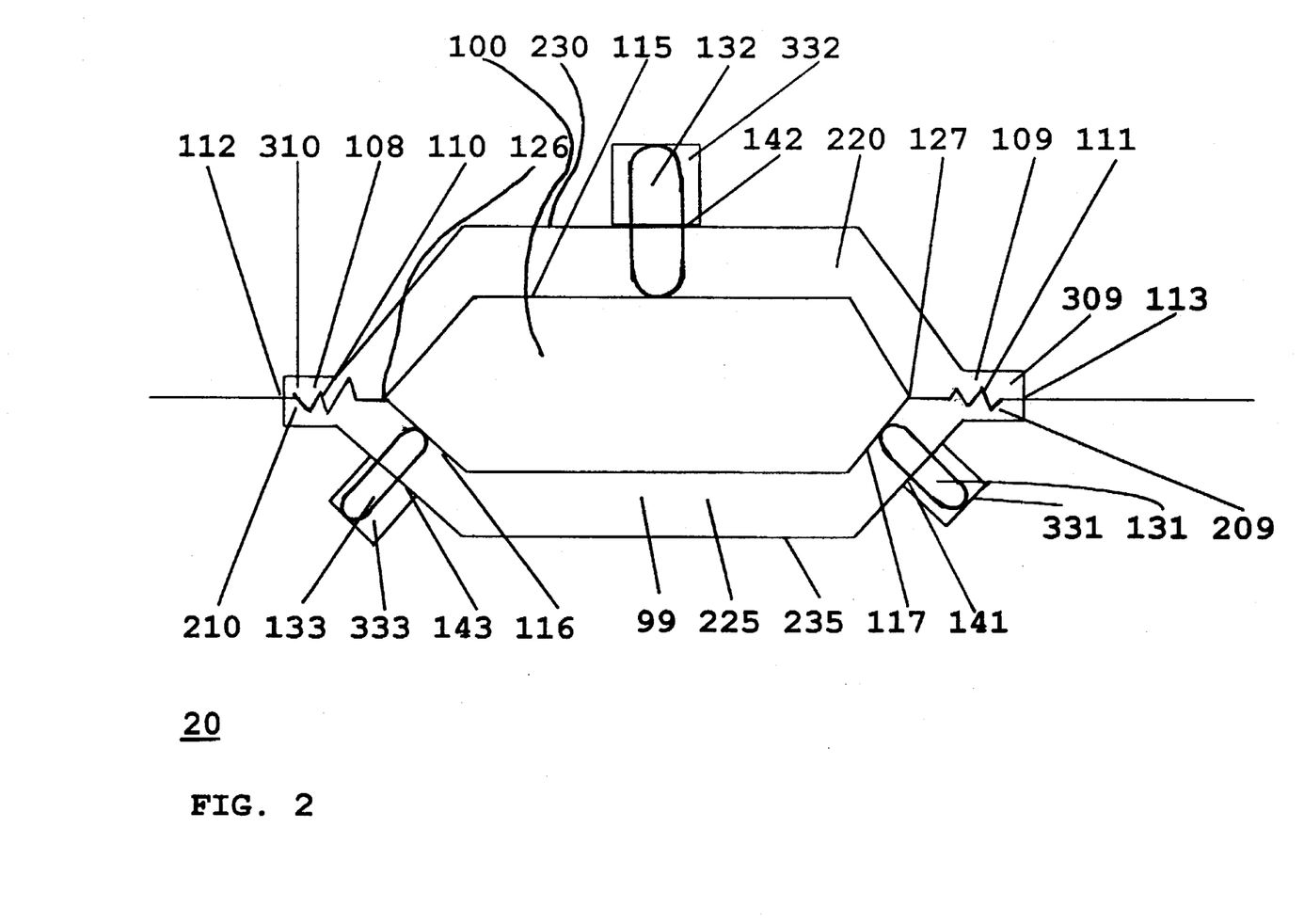
FIG. 2 is a partial cross-section view of the acceleration indicator.

FIG. 2 is a cross sectional view of the acceleration indicator 20 taken at the stasis springs 110 and 111 and showing the relationship between the inertial weight 100, the lower main casing 235 and the top main casing 230. The inertial weight 100 cross section is hexagonal in shape. The weight 100 rests in a weight channel 99 formed by a lower inertial weight chamber 225 in the lower main case 235 and by an upper inertial weight chamber 220 formed in the top main casing 230.

The bottom left angle edge 116 of the inertial weight 100 is supported by the wheel 133. Wheel 133 is supported in wheel alcove 333 by axle 143. Wheel 133 and all wheels in the acceleration indicator have a ball bearing which minimizes rotational friction.

The bottom right angle edge 117 of the inertial weight 100 is supported by the wheel 131. Wheel 131 is supported in wheel alcove 331 by axle 141.

The top horizontal edge 115 of inertial weight 100 is in contact with and stabilized by wheel 132. Wheel 132 is supported in wheel alcove 332 in the top main casing 230 by axle 142.

The left stasis spring 110 is attached at the left center angle 126 of the inertial weight 100. The other end of the left stasis spring 110 is attached at the left spring cavity wall 112 of the lower main casing 235. The left spring cavity 108 is formed from the lower left spring recess 210 in the lower main casing 235 and the upper left spring recess 310 in the top main casing 230.

The right stasis spring 111 is attached at the right center angle 127 of the inertial weight 100. The other end of the right stasis spring 111 is attached at the right spring cavity wall 113 of the lower main casing 235. The right spring cavity 109 is formed from the lower right spring recess 209 in the lower main casing 235 and the upper right spring recess 309 in the top main casing 230.

Figure 3:
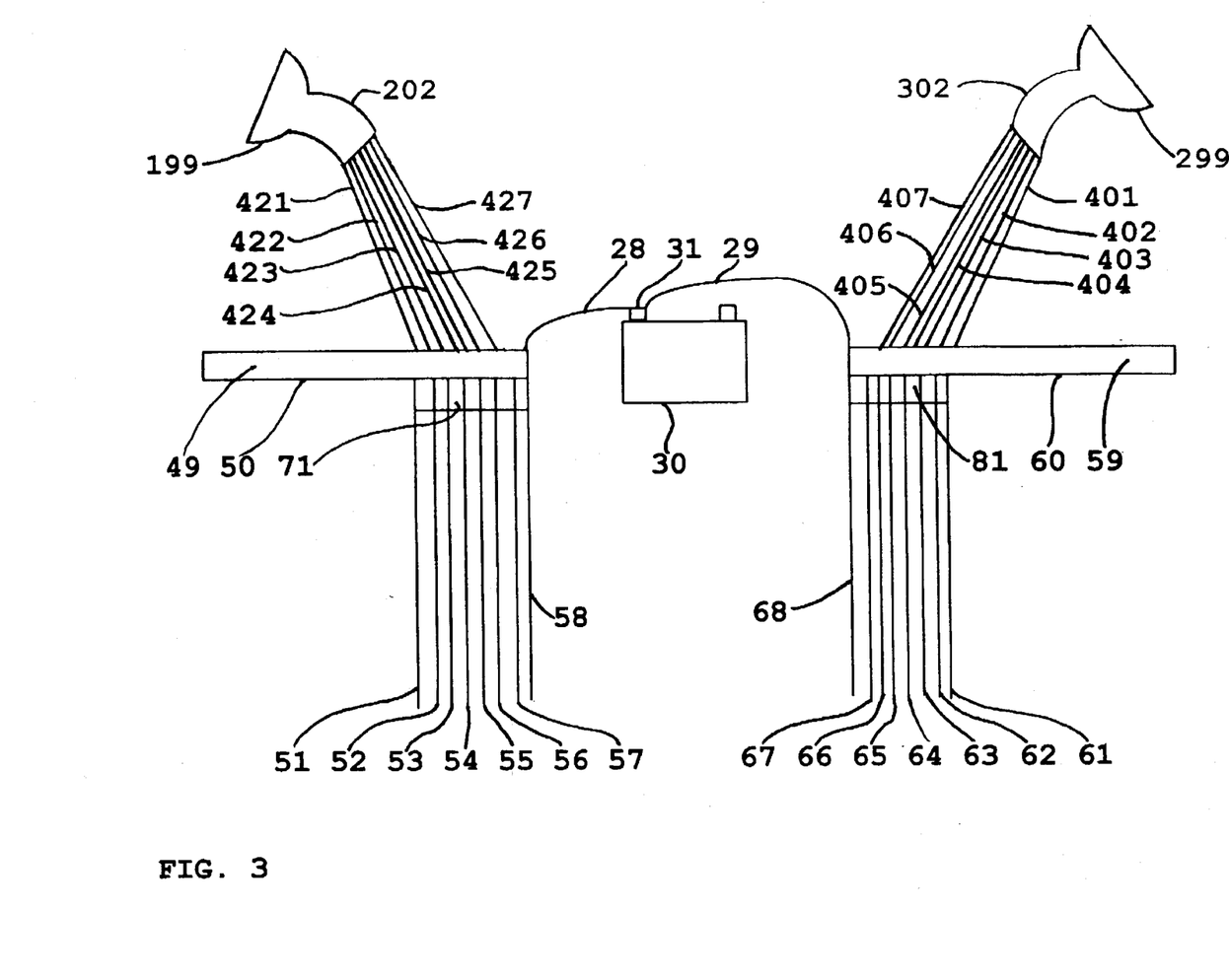
FIG. 3 is a diagrammatic representation of the leaf contact assemblies and conductor wires of the acceleration indicator.

FIG. 3 is a diagrammatic representation of the front leaf contacts assembly 50 and the rear leaf contacts assembly 60.

The front leaf contacts assembly 50 includes 7 non-charged leaf contacts 71–77 and front activating leaf contact 58. Front activating leaf contact 58 is connected by cable 28 to the positive pole 31 of the vehicle battery 30. Each leaf contact 51–58 is separated from all adjacent leaf contacts by insulated leaf contact spacers 71 to prevent unintended contact between the leaf contacts. Each leaf contact is fixed at one end into the leaf contact assembly base 49. Each non-charged leaf contact 51–57 is connected to a wire or conductor 421–427, respectively. The conductors 421–427 are bundled into the front conductor cable 202 which terminates in a female connector 199. Contact between leaf contact 58 and non-charged leaf contact 57 (as occurs when the inertial weight moves forward) sends a positive charge to connector 427. Further contact between leaf contact 58 and 57 and 56 sends a positive charge to both connectors 427 and 426. In a similar fashion contact between all leaf contacts will send a positive charge to all connectors in the cable 202.

Figure 4A:
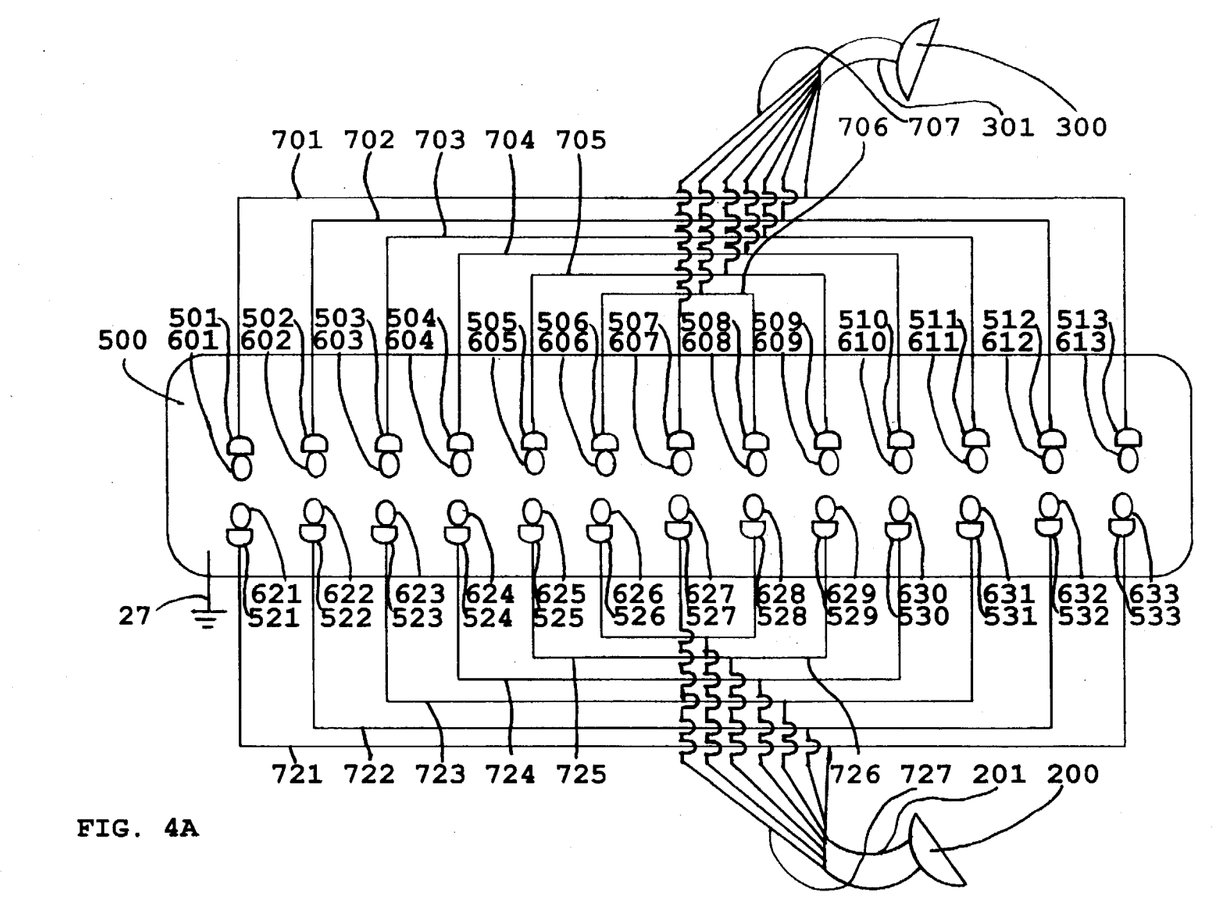
FIG. 4A is a diagrammatic representation of the light bar showing the connections of lights and connectors.

There is one non-charged leaf contact for each set of bulbs in the light bar (FIG. 4A). Although the example described herein has 7 non-charged contacts and 13 bulbs, any number of contacts and bulbs may be used.

The rear leaf contacts assembly 60 includes 7 non-charged leaf contacts 61–67 and front activating leaf contact 68. Front activating leaf contact 68 is connected by cable 29 to the positive pole 31 of the vehicle battery 30. Each leaf contact 61–68 is separated from all adjacent leaf contacts by insulated leaf contact spacers 81 to prevent unintended contact between the leaf contacts. Each leaf contact is fixed at one end into the leaf contact assembly base 59. Each non-charged leaf contact 61–67 is connected to a wire or conductor 401–407, respectively. The conductors 401–407 are bundled into the rear conductor cable 302 which terminates in a female connector 299. Contact between leaf contact 68 and non-charged leaf contact 67 (as occurs when the inertial weight moves rearward) sends a positive charge to connector 407. Further contact between leaf contact 68 and 67 and 66 sends a positive charge to both connectors 407 and 406. In a similar fashion contact between all leaf contacts will send a positive charge to all connectors in the cable 302.

The inertial weight 100 has a torpedo shape, is hexagonal in cross section, and its front end 101 and rear end 102 have a pyramid shape. It should be noted that the cross section of the inertial weight may be circular, or polygonal. In addition, the ends may be conical, or have any other suitable shape.

Movement of the inertial weight in response to inertial forces is facilitated by wheels 139. Other constructions which allow the relatively free motion of the inertial weight 100 in the weight channel 99 may also be used, such as using wheels on the inertial weight rather than in the channel, or using teflon pads to support the inertial weight.

Movement of the inertial weight is moderated by stasis springs 110, 111. These springs 110, 111 exert enough force on the weight 100 to cause it to return to its equilibrium position in which there is no contact of inertial weight with front 50 or rear 60 leaf contact assemblies in the absence of acceleration or decelleration. Other arrangements may be used to moderate the movement of the inertial weight, such as the use of light springs to attach the ends of the inertial weights to the front and rear ends of the main casing.

The main casing is constructed of any strong material such as aluminum or high impact polymer. Lexan is the preferred material.

The leaf contacts are constructed of electrically conductive metal such as copper, steel, or aluminum or alloys of these metals. Steel is the preferred material.

Leaf contact spacers are electrically nonconductive and may be constructed of plastics, ceramics, fiberboard, or other suitable materials. Fiberboard is the preferred material The inertial weight is constructed of any hard, dense material, such as steel, lead, copper, ceamic, vulcanized rubber. Steel is the preferred material.

FIG. 4A is a diagrammatical representation of the light bar housing 500 showing in particular the arrangement of the lights on the light bar. The light bar housing 500 is constructed preferably of metal but may be constructed of any suitable strong material, such as plastic. The metal light bar housing 500 is grounded to the vehicle frame by ground wire 27. The vehicle frame (not shown) is grounded to the negative terminal of the battery 30. Each socket 501–513 and 521–533 is grounded to the light bar housing, allowing the completion of the circuit when the bulbs are lighted. When the light bar housing is made of plastic, the individual sockets are grounded to ground wire 27, allowing completion of the circuit when the bulbs are lighted.

The upper row of sockets 501–513 received green light bulbs 601–613 and are wired to the rear leaf contacts assembly 60 and are illuminated on vehicle acceleration. The lower row of sockets 521–533 receive red light bulbs 621–633 and are wired to the front leaf contacts assembly 50 and are illuminated on vehicle deceleration.

Although the example in FIG. 4A shows bulbs arrayed in straight lines, any other arrangement of the bulbs may be used, such as forming a circle, a triangle, a square, etc.

The term "light bulb" as used in this disclosure indicates preferably incandescent light bulbs but may also mean light emitting diodes (LED) or fluorescent bulbs or any other suitable light source.

Conductors 721–727 leading to the lower row of sockets 521–533 are bundled into a cable 201 which terminates in the front male connector 200. Front male connector 200 plugs into front female connector 199 shown in FIGS. 1 and 3. Deceleration of the vehicle causes the inertial weight 100 in FIG. 1 to move toward the front of the vehicle and the front end 101 of the inertial weight 100 to make contact with the front actuating leaf contact 58 in FIG. 3 and cause that contact to touch front leaf contact 57 in FIG. 3. Actuating leaf contact 58 is said to "activate" front leaf contact 57. This activation sends electrical current through front conductor 427, through front female connector 199, through front male connector 200 in FIG. 4, through conductor 727, to socket 527 to illuminate red bulb 627. Sustained or additional deceleration causes the inertial weight 100 in FIG. 1 to move forward an additional amount causing contact between front actuating leaf contact 58 and both front leaf contacts 56 and 57. The activation of contact 56 causes illumination of bulbs 626 and 628. Activation of contacts 55, 54, 53, 52, and 51 causes illumination of bulbs 625 and 629; 624 and 630; 623 and 631; 622 and 632; and 621 and 633, respectively. Thus the illumination of the bulbs of the lower row of sockets 521–533 on deceleration occurs initially at the center of the light bar and the bulbs on either side of the center of the bar are then sequentially illuminated. Deceleration at a low rate will result in illumination of only the middle bulb or a few bulbs near the middle of the light bar. Rapid deceleration will result in rapid illumination of all or most of the bulbs in a sequence beginning at the middle of the light bar and proceeding to either end of the light bar.

Conductors 701–707 leading to the upper row of sockets 501–513 are bundled into a cable 301 which terminates in the rear male connector 300. Rear male connector 300 plugs into rear female connector 299 shown in FIG. 1 and FIG. 2. Acceleration of the vehicle causes inertial weight 100 in FIG. 1 to move toward the rear of the vehicle and the rear end 102 of the inertial weight 100 to make contact with the rear actuating leaf contact 68 in FIG. 3 and causes that contact to touch rear leaf contact 67 in FIG. 3. Rear actuating leaf contact 68 is said to "activate" rear leaf contact 67. This activation sends electrical current through rear conductor 407, through rear female connector 299, through rear male connector 300 in FIG. 4, through conductor 707, and to socket 507 to illuminate green bulb 607.

Sustained or additional acceleration causes the inertial weight 100 in FIG. 1 to move backward an additional amount causing contact between rear actuating leaf contact 68 and both rear leaf contacts 66 and 67. The activation of contact 66 causes illumination of bulbs 606 and 608. Activation of contacts 65, 64, 63, 62, and 61 cause illumination of bulbs 605 and 609; 604 and 610; 603 and 611; 602 and 612; and 601 and 613, respectively. Thus the illumination of the bulbs of the upper row of sockets 501–513 on acceleration occurs initially at the center of the light bar and the bulbs on either side of the center of the bar are then sequentially illuminated. Acceleration at a low rate will result in illumination of only the middle bulb or a few bulbs near the middle of the light bar. Rapid acceleration will result in rapid illumination of all or most of the bulbs in a sequence beginning at the middle of the light bar.

Figure 4B:
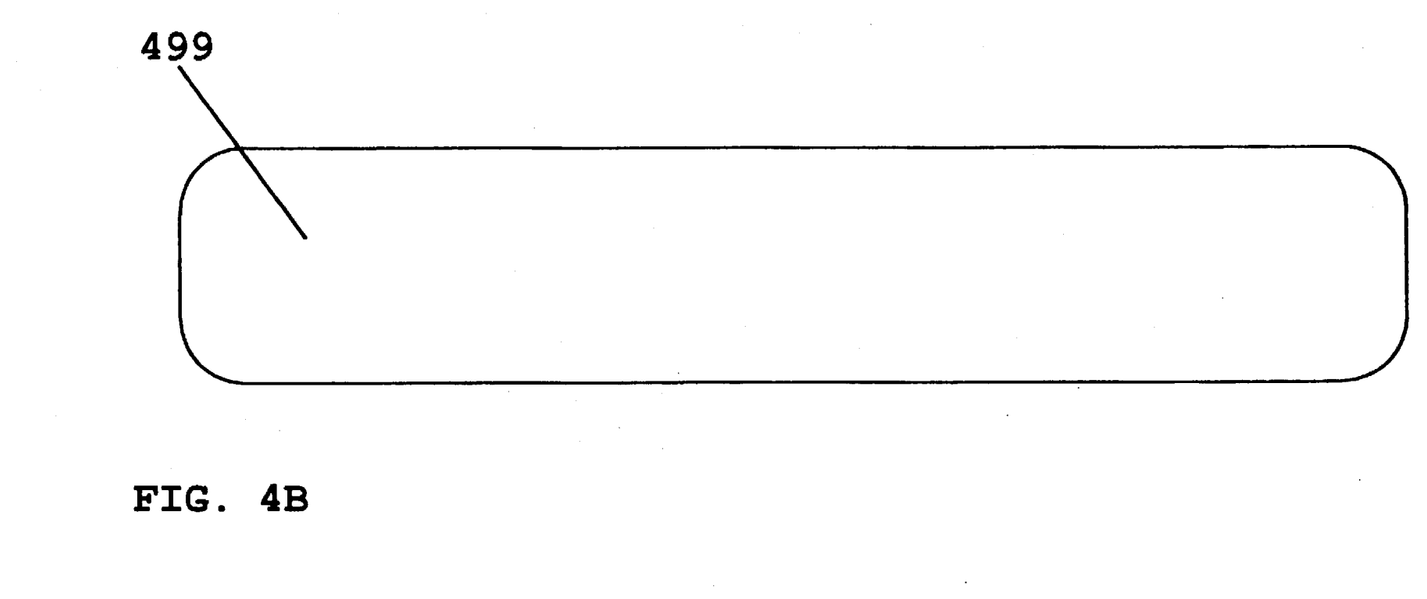
FIG. 4B is a representation of the light bar lens.

FIG. 4B is a representation of the lens 499 of the light bar. The lens is constructed of plastic or lexan or any other suitable conventional transparent or translucent material.

In a second embodiment, the rear leaf contacts assembly and associated conductors, connectors, and lights are omitted. In this embodiment the signal system functions only to indicate deceleration.

It will be apparent to those skilled in the art that the examples and embodiments described herein are by way of illustration and not of limitation, and that other examples may be used without departing from the spirit and scope of the present invention, as set forth in the appended claims.

I claim:

1. A acceleration and deceleration signal system for a vehicle comprising:

a casing having front and rear ends, said casing mounted in said vehicle with said front end toward the front end of said vehicle and said rear end toward the rear end of said vehicle, an inertial weight not connected to a braking or accelerating system, wheels supporting said inertial weight in said casing which allow said inertial weight to move freely toward the front or rear end of said casing in response to inertial forces, springs which restrain the movement of said inertial weight and cause said weight to remain in the middle of said casing in the absence of inertial forces, a front leaf contact assembly mounted at said front end of said casing so that deceleration of said vehicle will cause movement of said inertial weight toward said front leaf contact assembly, contact of said inertial weight with said front leaf contact assembly, and activation of leaf contacts in said front leaf contact assembly, a light bar assembly having connectors, sockets, and a first array of bulbs having a first color, said bulbs being illuminated when said front leaf contacts are activated, a rear leaf contact assembly mounted at said rear end of said casing so that acceleration of said vehicle will cause movement of said inertial weight toward said rear leaf contact assembly, contact of said inertial weight with said rear leaf contact assembly, and activation of leaf contacts in said rear leaf contact assembly, connectors, sockets, and a second array of bulbs having a second color, mounted in said light bar assembly, said bulbs being illuminated when said rear leaf contacts are activated, a battery and connectors connecting said leaf contact assemblies and said light bar with said battery.

2. The system of claim 1 wherein said wheels have ball bearings to reduce rotational friction.

3. The system of claim 1 wherein said inertial weight is hexagonal in cross section.

4. The system of claim 1 wherein said arrays of bulbs are rows.

5. The system of claim 4 wherein the center bulb in a row is illuminated first, bulbs adjacent to said center bulb are illuminated next, and bulbs adjacent to said adjacent bulbs are illuminated next, until all bulbs in said row are illuminated.

6. The system of claim 1 wherein said first color of bulbs is red.

7. The system of claim 1 wherein said second color of bulbs is green.

8. A deceleration signal system for a vehicle comprising:

a casing having front and rear ends, said casing mounted in said vehicle with said front end toward the from end of said vehicle and said rear end toward the rear end of said vehicle, an inertial weight not connected to a braking or accelerating system, wheels supporting said inertial weight in said casing which allow said inertial weight to move freely toward the front or rear end of said casing in response to inertial forces, springs which restrain the movement of said inertial weight and cause said weight to remain in the middle of said casing in the absence of inertial forces, a front leaf contact assembly mounted at said front end of said casing so that acceleration of said vehicle will cause movement of said inertial weight toward said front leaf contact assembly, contact of said inertial weight with said front leaf contact assembly, and activation of leaf contacts in said from leaf contact assembly, a light bar assembly having connectors, sockets, and bulbs, said bulbs being illuminated when said front leaf contacts are activated, a battery and connectors connecting said leaf contact assembly and said light bar with said battery.

9. The system of claim 8 wherein said wheels have ball bearings to reduce rotational friction.

10. The system of claim 8 wherein said inertial weight is hexagonal in cross section.

11. The system of claim 8 wherein said bulbs are arrayed in a row or rows.

12. The system of claim 11 wherein the center bulb in a row is illuminated first, bulbs adjacent to said center bulb are illuminated next, and bulbs adjacent to said adjacent bulbs are illuminated next, until all bulbs in said row are illuminated.

13. The system of claim 8 wherein the bulbs are red.

14. The process of indicating the acceleration or deceleration of a vehicle comprising the steps:

illuminating an array of bulbs having a first color located on the rear of said vehicle during deceleration, and illuminating an array of bulbs having a second color located on the rear of said vehicle during acceleration.

15. The process of claim 14 wherein said first color is red and said second color is green.

16. The process of claim 14 wherein said arrays of bulbs are illuminated sequentially beginning in the center of said arrays and proceeding to the extremes of said arrays.

17. A acceleration and deceleration signal system for a vehicle comprising:

a casing having front and rear ends, said casing mounted in said vehicle with said from end toward the front end of said vehicle and said rear end toward the rear end of said vehicle, an inertial weight hexagonal in cross section, wheels supporting said inertial weight in said casing which allow said inertial weight to move freely toward the front or rear end of said casing in response to inertial forces, said wheels in contact on three of the six sides of said inertial weight, springs which restrain the movement of said inertial weight and cause said weight to remain in the middle of said casing in the absence of inertial forces, a front leaf contact assembly mounted at said front end of said casing so that deceleration of said vehicle will cause movement of said inertial weight toward said front leaf contact assembly, contact of said inertial weight with said front leaf contact assembly, and activation of leaf contacts in said front leaf contact assembly, a light bar assembly having connectors, sockets, and a first array of bulbs having a first color, said bulbs being illuminated when said front leaf contacts are activated, a rear leaf contact assembly mounted at said rear end of said casing so that acceleration of said vehicle will cause movement of said inertial weight toward said rear leaf contact assembly, contact of said inertial weight with said rear leaf contact assembly, and activation of leaf contacts in said rear leaf contact assembly, connectors, sockets, and a second array of bulbs having a second color, mounted in said light bar assembly, said bulbs being illuminated when said rear leaf contacts are activated, a battery and connectors connecting said leaf contact assemblies and said light bar with said battery.

18. A deceleration signal system for a vehicle comprising:

a casing having front and rear ends, said casing mounted in said vehicle with said front end toward the front end of said vehicle and said rear end toward the rear end of said vehicle, an inertial weight, wheels supporting said inertial weight in said casing which allow said inertial weight to move freely toward the front or rear end of said casing in response to inertial forces, said wheels in contact on three of the six sides of said inertial weight, springs which restrain the movement of said inertial weight and cause said weight to remain in the middle of said casing in the absence of inertial forces, a front leaf contact assembly mounted at said front end of said casing so that acceleration of said vehicle will cause movement of said inertial weight toward said front leaf contact assembly, contact of said inertial weight with said front leaf contact assembly, and activation of leaf contacts in said front leaf contact assembly, a light bar assembly having connectors, sockets, and bulbs, said bulbs being illuminated when said front leaf contacts are activated, a battery and connectors connecting said leaf contact assembly and said light bar with said battery.

* * * * *